United States Patent [19]

Machaczek

[11] 4,168,622

[45] Sep. 25, 1979

[54] ARRANGEMENT FOR PRESSURIZING AND PRESSURE REGULATION IN TEST PIECES, FOR EXAMPLE, IN PIPE SECTIONS SEALED AT BOTH ENDS

[75] Inventor: Robert Machaczek, Augsburg, Fed. Rep. of Germany

[73] Assignee: Institut fur Pruftechnik Ing. Wolfgang Prochaska und Co KG, Fed. Rep. of Germany

[21] Appl. No.: 890,292

[22] Filed: Mar. 27, 1978

[51] Int. Cl.² ........................................... G01M 3/28
[52] U.S. Cl. ................................. 73/49.5; 73/49.1
[58] Field of Search ...................... 73/49.5, 49.6, 49.1, 73/40; 138/91, 104

[56] References Cited

U.S. PATENT DOCUMENTS

| | | | |
|---|---|---|---|
| 2,140,892 | 12/1938 | Brittain | 73/49.5 |
| 2,761,310 | 9/1956 | Siegel | 73/49.5 X |
| 2,805,569 | 9/1957 | Billen et al. | 73/49.5 |
| 3,121,323 | 2/1964 | Wishon et al. | 73/49.6 X |
| 3,312,103 | 4/1967 | Goeke | 73/49.6 X |
| 3,566,675 | 3/1971 | Ledebur | 73/49.5 |
| 3,877,293 | 4/1975 | McKeage | 73/49.1 |

*Primary Examiner*—John Petrakes
*Attorney, Agent, or Firm*—Hill, Van Santen, Steadman, Chiara & Simpson

[57] ABSTRACT

In the illustrated embodiment, the amplitude of sinusoidal pressure variations in the test piece is adjustable even during operation by summing the sinusoidal volume variations in two piston assemblies whose relative phase is continuously adjustable. The eccentric drives for the piston assemblies may be coupled via a bevel gear arrangement whereby angular shifting of the intermediate gear about the common axis of the outer gears shifts the phase relation between the eccentric drives. A desired minimum resultant pressure may be maintained in the test piece by introducing a bias pressure value equal to or exceeding the amplitude of the pressure variation, and such bias pressure may be adjusted in response to any permanent deformation of the test piece to maintain the desired minimum resultant pressure.

5 Claims, 6 Drawing Figures

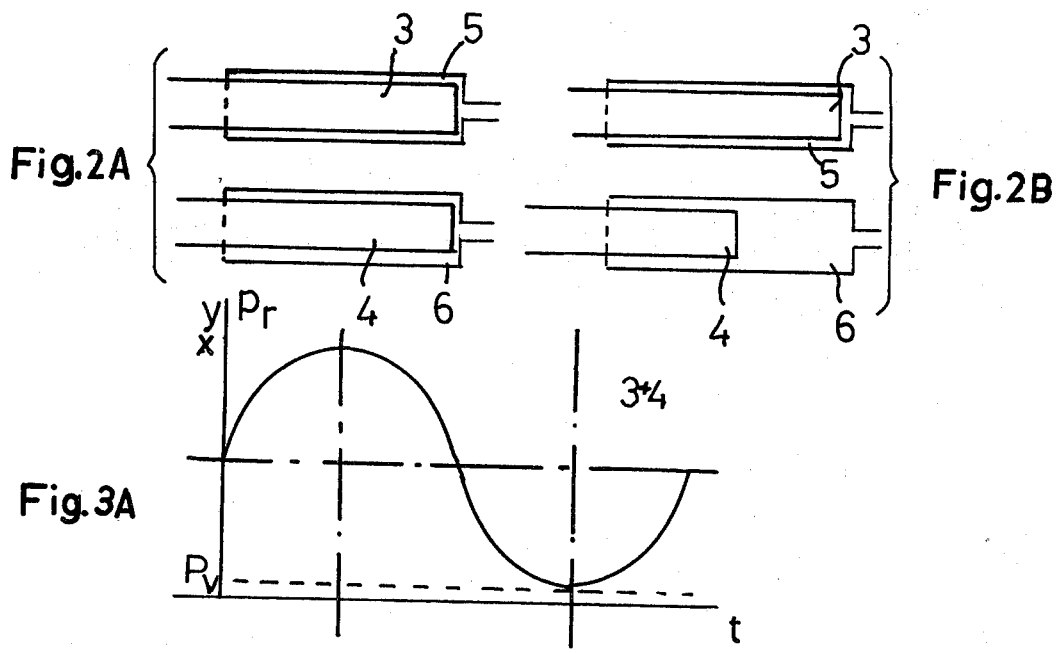
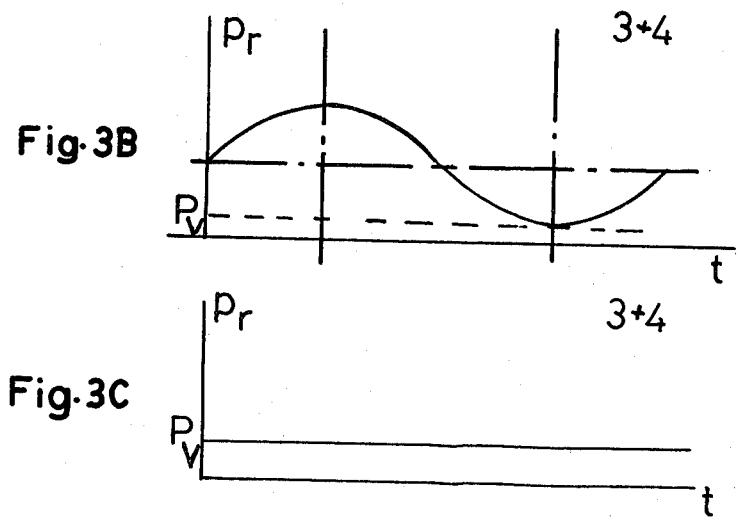

ARRANGEMENT FOR PRESSURIZING AND PRESSURE REGULATION IN TEST PIECES, FOR EXAMPLE, IN PIPE SECTIONS SEALED AT BOTH ENDS

BACKGROUND OF THE INVENTION

The invention relates to an arrangement for pressurizing and pressure regulation in test pieces, for example, in pipe sections sealed at both ends for the purpose of carrying out long-duration tests (fatique tests) in accordance with prescribed, sinusoidal pressure variations with and without a constant pressure prescription.

It has proven advantageous to vary the pressure when testing pipes for longitudinal stress and peripheral stress. However, in order to carry out such variations continuously and evenly distributed through all pressure values, the pressure variation must logically be sinusoidal. Indeed, such sinusoidal pressure variations for long-duration tests in test pieces can simply be carried out with the utilization of pressure pistons; however, if only pressure pistons are employed for the production of sinusoidal pressure variations, the amplitude of the pressure variation and also the constant pressure prescription cannot selectively and arbitrarily be set therewith.

SUMMARY OF THE INVENTION

The objective of the present invention is to provide with simple means an arrangement for pressurizing and pressure regulation in test pieces, for example in pipe sections sealed at both ends, not only permitting the constant pressure prescription but also permitting the sinusoidal pressure alteration during the operation.

This is obtained in that this arrangement consists of two piston assemblies kept in motion by a common drive via a bevel gear arrangement, said piston assemblies having pressure chambers connected with one another and with the test piece via a corresponding pipe connection so that by summing the volume variations in the pressure chambers of the piston assemblies corresponding pressure variations can be produced in the test piece (7).

In this manner a pressure can become effective in the test piece via the common access to the test piece, said pressure being that which results from the addition of the effects, i.e. of the volume variation in the two piston assemblies. As the volume variation in each of the two piston assemblies effects a sinusoidal pressure variation, an addition of the sinusoidal pressure variations in the test piece results from the addition of the volume variations in the two piston arrangements, i.e. again a sinusoidal pressure variation results.

In accordance with a further development of the invention the test piece consists of elastic material and-/or the test piece is connected to a sealed expansion receptacle.

Thereby it is possible to subject all types of test pieces, i.e. not only those consisting of elastic, but also those consisting of non-elastic material, to long-duration tests (fatique tests) having sinusoidal stress variations.

In accordance with another development of the invention each pressure piston is eccentrically coupled to a drive pulley in a manner per se known, each drive pulley being respectively mounted on the same axis as a corresponding bevel gear of the bevel gear arrangement respectively assigned to one pressure piston in order to connect to the same drive, both bevel gears being coupled via a third bevel gear, and whereby the axis of the third bevel gear is perpendicular to the axis of the two other bevel gears, and the axis of the third bevel gear can be pivoted about the axis of the two other bevel gears for the selective alteration of the setting of the position of the eccentric coupling points associated with the two drive pulleys in relation to one another.

With the aid of these bevel gears the position of the eccentric coupling points associated with the drive pulley in relation to one another can be continuously altered and thus also the position of the pressure pistons in the pressure chambers. This means that if one pressure piston is brought into a previously defined zero position, the position and thus the volume of the other pressure piston in relation to the first pressure piston can be arbitrarily set. The pressure alteration in the test piece can thereby be set, as initially mentioned.

In accordance with another development of the invention, by turning of the third bevel gear about the axis of the two other bevel gears for the selective alteration of the setting of the position of the eccentric coupling points associated with the two drive disks and of the position of the two pistons in relation to one another, the sum of the volumes of the pistons, and thus the amplitude of the sinusoidal pressure variation can be adjusted in the test piece.

This setting of the sinusoidal pressure variation proceeds with the aid of simple and precise mechanical means.

In accordance with a further development of the invention, by means of a fluid connection to the fluid system between the pressure piston assemblies and the test piece, the constant pressure specification for the test piece can be maintained at a minimum pressure value which is conditioned by and adjustable according to the minimum value of the sinusoidal pressure variation. By this means, and for example taking advantage of corresponding pressure measurement installations, and valves which are adjustable as a function of the pressure measurements, the minimum pressure in the test piece—even when the latter becomes deformed due to prolonged experiments—can be kept constant also during the test operation.

One sample embodiment of the invention is described with the aid of the accompanying sheets of drawings; other objects, features and advantages will be apparent from this detailed disclosure and from the appended claims.

BRIEF DESCRIPTION OF THE DRAWINGS

FIG. 2, as example, shows two different relative initial settings of the pistons designated FIGS. 2A and 2B; and FIG. 3 comprises FIGS. 3A, 3B and 3C, FIGS. 3A and 3B showing the apertaining pressure variations in the test piece for the different piston initial positions shown in FIG. 2, and FIG. 3C indicating the resulant pressure where the pistons are set to be 180° out of phase.

DETAILED DESCRIPTION

Figure 1:
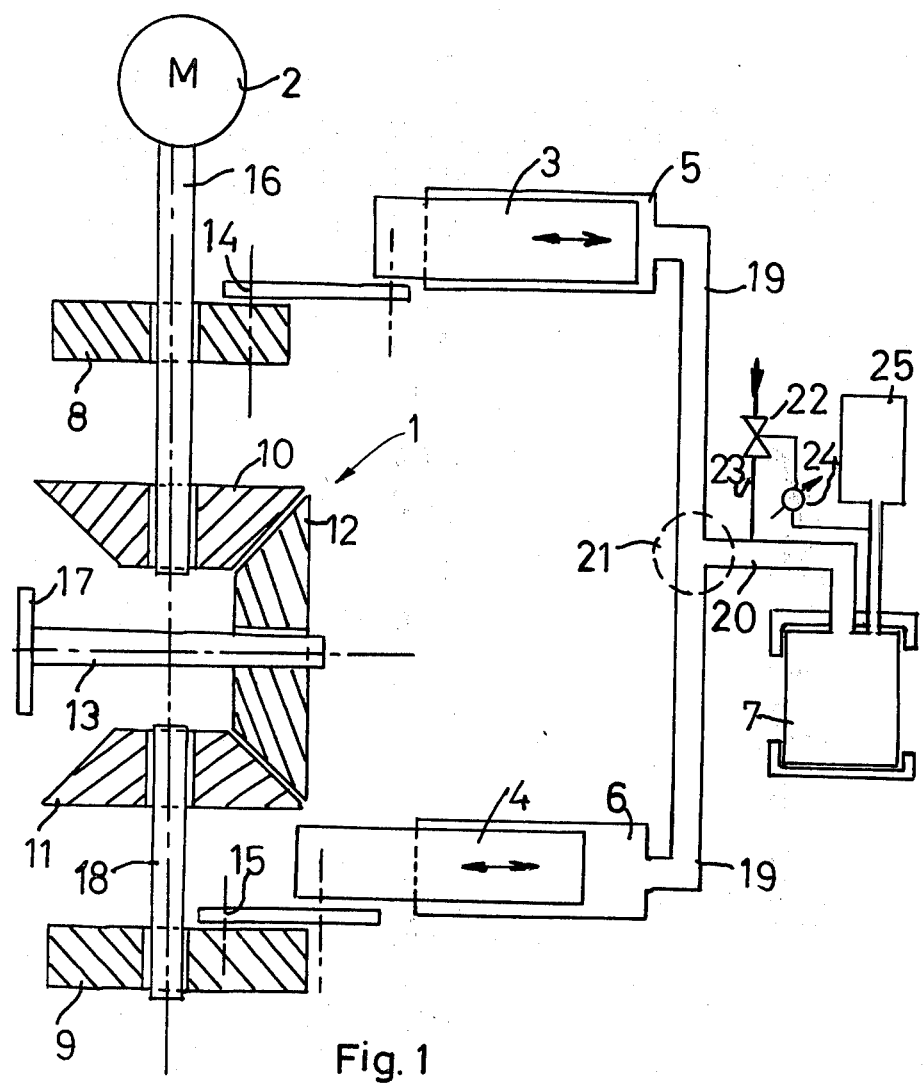
FIG. 1 is a diagrammatic illustration showing an overview of the inventive arrangement.

In FIG. 1 a motor drive 2 for the bevel gear arrangement 1 is shown entirely diagrammatically. The motor 2 drives a drive pulley 8, and a bevel gear 10 may be driven from pulley 8 via a common shaft 16. The piston 3 is eccentrically coupled to the drive pulley 8, whereby the piston 3 is moved back and forth in the pressure chamber 5 in the known manner by means of rotating the drive pulley 8. (Instead of the motor 2 being coupled to shaft 16, the motor 2 may drive pulley 8 by means of a positive belt drive for example, so that shaft 16 does not actually extend above pulley 8. Alternatively the drive pulley 8 may drive a second pulley laterally adjacent thereto and carrying the eccentric coupling 14.) An additional bevel gear 12 is freely rotatable on a shaft 13 whose axis lies perpendicularly to the drive shaft 16. The bevel gear 11 has a shaft 18 which again has the same axis direction as the drive shaft 16 and thus lies also perpendicularly to the axis of shaft 13 of the bevel gear 12. Another drive pulley 9 is attached to the first mentioned shaft 18 of the bevel gear 11, said drive pulley 9 being eccentrically coupled to the piston 4 to move the piston 4 back and forth in the pressure chamber 6 during rotation of the pulley 9 via corresponding connection means, to vary the volume in said pressure chamber 6. The bevel gears 10 and 11 are fixed to shafts 16 and 18, so that bevel gear 12 serves to drive pulley 9 in synchronism with pulley 8, for a given angular setting of shaft 13. (The drive connection from pulley 9 to piston 4 may be actually located on the underside of pulley 9, or may include a second drive pulley so as to be essentially similar to the drive connection between pulley 8 and piston 3, and so as to avoid interference with shaft 18.)

It is indeed known that by moving a piston with a drive pulley in a pressure chamber via an eccentric connection and with the aid of the volume alterations resulting thereby, sinusoidal pressure variations can be produced at the outlet of the pressure chamber. However, said pressure variations are not yet arbitrarily controllable in regard to their amplitude. In order to obtain that, the pressure pistons 5 and 6 are connected to one another and with the test piece 7 via a pipe connection 19.

The test piece 7, for example, is a pipe section to be tested, i.e. a hollow cylinder section is taken from a continuous production for the purpose of a long-duration test. Such a pipe section is sealed at both ends and then connected with a pressure supply pipe, with the pipe 19 in the present example, via the connection pipe 20.

If the motor drive 2 is now set in motion, both the pistons are moved back and forth in their pressure chambers. As both the pistons are connected with one another and with the test piece via the connection pipe 20, pressure variations, formed from the sum of the volume alterations in the pressure chambers, are applied at the junction point 21. These pressure variations are also effective in the test piece 7. These variations result from the addition of the two volume alterations in the pistons causing the sinusoidal pressure variations. The sum of the two pressure variations in the test piece again results in a sinusoidal pressure variation.

In order to determine the pressure variation as to amplitude, which results as the resultant, the pistons 3 and 4 can be arbitrarily set by rotating the axis of elements 13 and 17 to shift the bevel gear 12 about the axis of shafts 16 and 18 of the two other bevel gears 10 and 11. Changing the position of bevel gear 12 changes the pistons of the eccentric points 14, 15 of the two drive pulleys 8, 9 in relation to one another. This alteration of the position of the eccentric points 14, 15 of the drive pulleys in relation to one another, and thus of the piston initial positions in regard to one another, can be undertaken independently from the drive 2 even during the operation thereof. The adjustment effects an arbitrary and continuous alteration of the volumes of the pressure chambers. In order to provide an example, two different initial positions (volume of the chambers) of the pistons in relation to one another are illustrated in FIG. 2 for the two pistons 3 and 4. FIG. 3 shows by means of respective curves, the pressure variations which are produced during operation, for given phase relationships between pistons 3 and 4. It is the resulting pressure variation, which results at the test piece 7 from the addition of the volume alterations of the two pistons which is represented in FIG. 3.

The curve of FIG. 3A illustrates how the pressure behavior proceeds at a synchronism in the phase of the pistons, i.e. when the two pistons have to cover the maximum path from the same initial position. In that case the maximum pressure is formed. If a relative readjustment in the phase of the two pistons is undertaken by 90°, the respective maximum pressure is cut in half in accordance with the FIG. 3B. If a readjustment by 180° is undertaken and the pistons thus run completely out of phase the effect of the two pistons at the junction point 21 is cancelled. Only the pressure prescription, that is the straight line constant pressure function of FIG. 3C, remains.

As it is of advantage—if one does not operate with a vacuum—not to let the minimum pressure, which results from the sine-shaped alteration, fall below zero, it is desirable to select a certain constant pressure prescription. This minimum pressure thus must hold the pressure in the test piece 7 at least at zero, preferably, however, at 2 through 3 bar. This pressure prescription was already taken into consideration in the illustrations in accordance with FIG. 3.

Since, in the case of prolonged experiments, permanent deformations can come about in tubes possessing a certain flexibility, it is desirable to keep the pressure specification in the test piece constant after such deformations. Maintaining this constancy can be made dependent upon a pressure measurement in the test piece. In dependence upon (or as a function of) the pressure change in the test piece, a valve 22 can be controllably arranged in the pressure line 23. As mentioned above, this additional pressure specification proceeds in dependence upon (or as a function of) the measurement via a pressure measuring device 24.

In order to be able to carry out long-duration tests in test pieces, for example, 7, under pressure conditions which vary sinusoidally, it is per se desirable to carry out these tests either with test pieces consisting of an elastic deformable material, or of test pieces consisting of rigid material connected to a sealed expansion receptacle 25. By means of these presuppositions it is also possible to alter the amplitude of the pressure alterations without immediately bursting the test piece or immediately destroying the testing equipment.

A constant pressure specification may be maintained by connecting fluid conduit 23 with a fluid pressure source (indicated by the arrow in FIG. 1) via a controllable valve 22. The constant bias pressure introduced into the fluid system 7, 19, 20 via conduit 23 is such that the resultant pressure variation (such as shown by the solid line in FIG. 3A or B) does not fall below a value of $P_v$. As previously explained, it is desirable to establish a constant pressure specification such that the resultant pressure variation does not fall below zero. Preferably the pressure value $P_v$ is in the range of about two to three bar above the zero pressure level.

It will be apparent that many modifications and variations may be effected without departing from the scope of the novel concepts and teachings of the present invention.

I claim as my invention:

1. An arrangement for pressurizing and pressure regulation in test pieces, for example, in pipe sections sealed at both ends in order to carry out long duration (fatique) tests in accordance with prescribed, sinusoidal pressure variations with and without a constant pressure prescription, characterized in that said arrangement comprises two piston assemblies (3, 4) having respective pressure chambers (5, 6), means comprising drive means (2) and an adjustable gear arrangement (1) for operating said piston assemblies to generate sinusoidal volume variations in said pressure chambers (5, 6), and fluid connection means (19, 20) for connecting said pressure chambers with a test piece (7) so that pressure variations can be produced in the test piece (7) in accordance with the sum of the volume variations in said pressure chambers (5, 6).

2. An arrangement for pressurizing and pressure regulation in test pieces in accordance with claim 1, characterized in that the test piece (7) is either of elastic material and/or the test piece (7) is connected to a sealed expansion receptacle (25).

3. An arrangement for pressurizing and pressure regulation in test pieces in accordance with claim 1, characterized in said piston assemblies (3, 4) having pressure pistons for reciprocal movement in the pressure chambers (5, 6), the drive means (2) having a common drive axis, drive pulleys (8, 9) mounted on the common drive axis and having respective eccentric couplings (14, 15) for coupling with the respective pressure pistons, said adjustable gear arrangement comprising first and second bevel gears (10, 11) mounted on the common drive axis and driven with the respective drive pulleys (8, 9), the first bevel gear (10) being coupled with the drive means (2), and a third bevel gear (12) coupling the first bevel gear (10) with the second bevel (11) and having an axis perpendicular to the common drive axis such that adjustment of the third bevel gear (12) selectively changes the relative setting of the eccentric couplings (14, 15) with the respective pressure pistons.

4. An arrangement for pressurizing and pressure regulation in test pieces in accordance with claim 3, characterized in means for rotating the third bevel gear (12) about the common drive axis of the first and second bevel gears (10, 11) in order to selectively alter the setting of the relative positions of the eccentric couplings (14, 15) and thus of the positions of the two pistons in relation to one another, whereby the amplitude of the sinusoidal pressure variations in the test piece (7) can be adjusted.

5. An arrangement for pressurizing and pressure regulation in accordance with claims 1, 2, 3 or 4, characterized in a conduit (23) for applying a constant bias pressure to said fluid connection means (19, 20), so as to maintain a minimum resultant pressure in said test piece during operation of said piston assemblies, with said bias pressure being adjustable to set the minimum resultant pressure value for different amplitudes of the pressure variation in the test piece.

* * * * *